US007646112B2

(12) United States Patent
Devine

(10) Patent No.: US 7,646,112 B2
(45) Date of Patent: Jan. 12, 2010

(54) PARALLEL SUPPLY CURRENT SHARING USING THERMAL FEEDBACK

(75) Inventor: James Michael Devine, Blairstown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 77 days.

(21) Appl. No.: 11/905,251

(22) Filed: Sep. 28, 2007

(65) Prior Publication Data

US 2009/0085533 A1 Apr. 2, 2009

(51) Int. Cl.
*H02J 7/34* (2006.01)

(52) U.S. Cl. .......... 307/53

(58) Field of Classification Search .......... 307/53
See application file for complete search history.

(56) References Cited

U.S. PATENT DOCUMENTS 5,905,645 A * 5/1999 Cross .......... 363/65

* cited by examiner

*Primary Examiner*—Robert L. DeBeradinis
(74) *Attorney, Agent, or Firm*—Harness, Dickey & Pierce, P.L.C.

(57) ABSTRACT

The current sharing using thermal feedback, in accordance with various embodiments, includes controlling an amount of current output from each of a plurality of power modules based on the thermal characteristics of each respective power module.

20 Claims, 2 Drawing Sheets

PARALLEL SUPPLY CURRENT SHARING USING THERMAL FEEDBACK

BACKGROUND

The statements in this section merely provide background information related to the present disclosure and may not constitute prior art.

The present teachings relate to systems and methods for controlling current sharing of parallel power supplies using thermal feedback.

Electronic power generating systems for providing power to a load can typically include a plurality of power modules, or circuits, which each output a current to a common load. More particularly, the current output by each of the power modules is combined to cumulatively provide the needed amount of current drawn by the load. This is commonly referred to as current sharing, because the plurality of power modules shares in providing the current drawn by the load.

In many instances airflow and temperatures over and around the power system can be variant, or certain areas of the system can be exposed to greater amounts of heat such that each power module can experience differing thermal environments. That is, each power module may experience differing cooling and/or heating effects as a result of variances in airflow and heat exposure at different portions of the power system. Therefore, some power modules may operate at a higher temperature than other power modules of system, which will typically shorten operational life of the module. Thus, since each of the power modules is sharing in providing the needed current to the load, the shorter operational life of the hotter operating modules may result in shortening the overall life of the power generating system, lowering the overall reliability.

SUMMARY

In various embodiments of the present disclosure, a method for sharing current generation among a plurality of power modules utilized to power an electronic system is provided. The method may include controlling an amount of current output from each power module based on the thermal characteristics of each respective power module.

In various other embodiments of the present disclosure, a power generating system is provided. The system may include a plurality of power modules outputting current to a common load and a thermally controlled current sharing subsystem. The thermally controlled current sharing subsystem is structured and operable to control the current output by each of the power modules to establish an approximate thermal equilibrium among the power modules.

Further areas of applicability of the present teachings will become apparent from the description provided herein. It should be understood that the description and specific examples are intended for purposes of illustration only and are not intended to limit the scope of the present teachings.

BRIEF DESCRIPTION OF THE DRAWINGS

The drawings described herein are for illustration purposes only and are not intended to limit the scope of the present teachings in any way.

DETAILED DESCRIPTION OF EXAMPLE EMBODIMENTS

Figure 1:
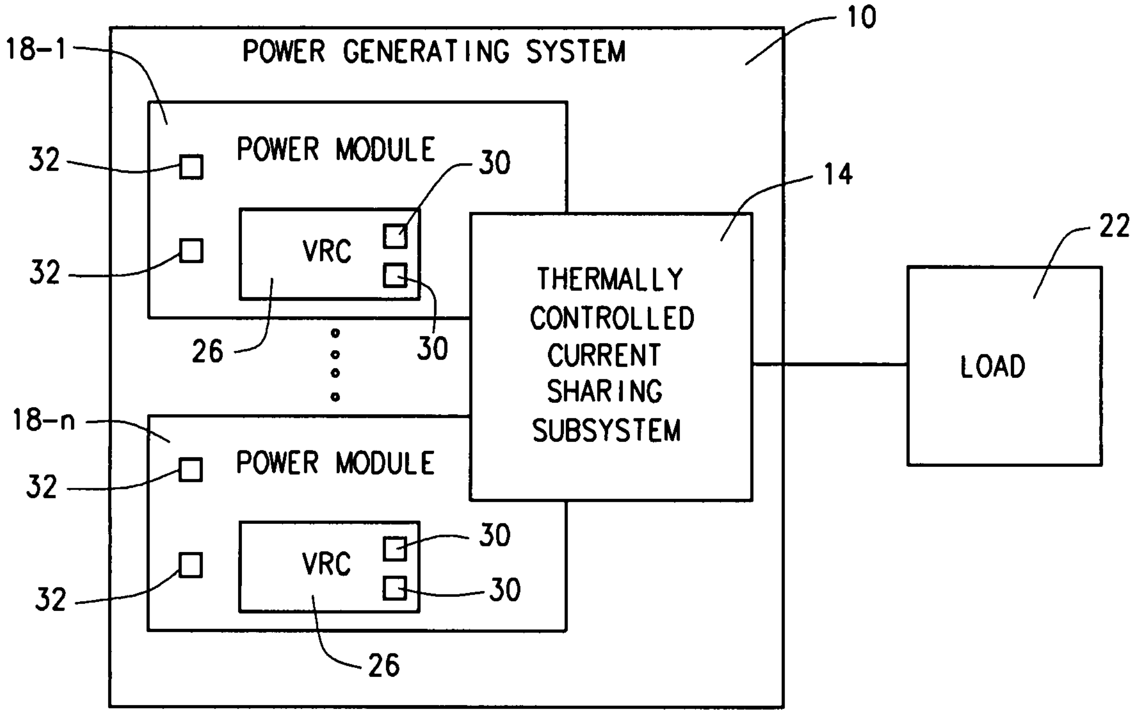
FIG. 1 is a block diagram illustrating a power generating system including a thermally controlled current sharing subsystem for current output by each of a plurality of power modules, in accordance with various embodiments of the present disclosure.

Example embodiments will now be described more fully with reference to the accompanying drawings. However, example embodiments may be provided in many different forms and should not be construed as being limited to the example embodiments set forth herein. Example embodiments are provided so that this disclosure will be thorough, and will fully convey the scope to those who are skilled in the art. In some example embodiments, well-known processes, well-known device structures, and well-known technologies are not described in detail to avoid the unclear interpretation of the example embodiments. Throughout the specification, like reference numerals in the drawings denote like elements.

The terminology used herein is for the purpose of describing particular example embodiments only and is not intended to be limiting. As used herein, the singular forms “a”, “an” and “the” may be intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof.

Additionally, it will be understood that when an element is referred to as being “on”, “connected to” or “coupled to” another element, it may be directly on, connected or coupled to the other element, or intervening elements may be present. In contrast, when an element is referred to as being “directly on,” “directly connected to” or “directly coupled to” another element, there may be no intervening elements present. As used herein, the term “and/or” includes any and all combinations of one or more of the associated listed items.

Furthermore, it will be understood that, although the terms first, second, third, etc. may be used herein to describe various elements and/or components, these elements and/or components should not be limited by these terms. These terms may be only used to distinguish one element or component, from another element or component. Thus, a first element or component, discussed below could be termed a second element or component without departing from the teachings of the example embodiments.

Still further, unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The systems and methods described below are applicable to any system that requires power and has a current sharing methodology for providing the power. Although various exemplary embodiments are illustrated and described, one skilled in the art would easily and readily recognize the present disclosure is applicable to any electronic system that requires power and has a current share methodology for delivering the power. For example, in various embodiments, the present disclosure is applicable to larger power modules, e.g., rectifiers, of power systems for providing power to wireless communication cell sites. While in other exemplary embodiments, the present disclosure is applicable to board mounted power systems that include a plurality of power modules on a circuit board.

FIG. 1 illustrates a power generating system 10 that includes a thermally controlled current sharing subsystem (TCCSS) 14 operable to control the current output by each of a plurality of power modules 18-1 through 18-*n* of the power generating system 10. The power modules 18-1 through 18-*n* are operable in a current sharing configuration such that the power modules 18-1 through 18-*n* cumulatively provide a needed amount of current drawn by a load 22. The power modules 18-1 through 18-*n* are simply referred to herein as power modules 18.

The power modules 18 may be any power generating device, component or circuit. For example, the power modules 18 may be DC to AC converters, AC to DC converters, DC to DC converters, power bricks, rectifiers, etc., that provide current to the load 22. The load 22 may be any device, component, system, mechanism, etc., that draws current. For example, in various embodiments, the power modules 18 are rectifiers of power systems for providing power to a load, e.g., wireless communication cell sites. While in other exemplary embodiments, the power modules 18 are board mounted converters that provide power to a load such as various electrical appliances.

Generally, the TCCSS 14 controls the current output by each of the power modules 18 based on a sensed temperature of a target location of each respective power module 18. That is, if the sensed temperature of the target location of any one or more power modules 18 is greater, i.e., hotter, than the target locations of the other power modules 18, the TCCSS 14 will reduce the current output of the hotter power module(s) 18.

More specifically, to generate an output current each of the power modules 18 includes, among other components (not shown), a voltage regulation circuit, or sub-module, 26. Each voltage regulation circuit 26 includes a plurality of voltage regulating components 30 operable to regulate the voltage output by the respective voltage regulation circuit 26. For example, each voltage regulation circuit 26 can include components such as band gap regulators, Zener diodes or other voltage references in a circuit that utilizes the reference voltage and controls the output of the power module 18 based on the reference voltage through feedback from the output. In various embodiments, each voltage regulation circuit 26 may be a digital circuit, while in other embodiments the voltage regulation circuit 26 may be an analog circuit.

Additionally, each power module 18 includes a plurality of power generating components 32 such as one or more switching power supplies, power transistors, transformer, coils, etc. During operation, the power generating components 32 generate heat. Particularly, some power generating components 32 characteristically generate more heat than the others, e.g., power transistors. The location of the power generating component 32 that generates the most heat during operation is considered the target location, or 'hot spot', of the respective power module 18. The hot spot of each power module 18 may be empirically determined or provided by the manufacturer of the respective power modules 18. Thus, in various embodiments, the TCCSS 14 monitors the temperature at the hot spot of each power module 18 and controls the voltage output of the voltage regulating circuits 26 based on the sensed hot spot temperatures. That is, if the sensed temperature of the hot spot of any one or more power modules 18 is greater than that at the hot spots of the other power modules 18, the TCCSS 14 will reduce the voltage output of the hotter power module(s) 18 via the respective voltage regulation circuit(s) 18.

Reducing the voltage output of voltage regulation circuit(s) 26 of the hotter power module(s) 18 will result in a reduction of the amount of current output by the hotter power module(s) 18. Furthermore, the reduction in current output of the hotter power module(s) 18 will result in a reduction of the operational temperature of the hotter power module(s) 18.

Since the power modules 18 are operable in a current sharing configuration, the cumulative current output of the power modules 18, i.e., the current output of the power generating system 10, is self-leveling. That is, as the current output by the hotter power module(s) 18 is reduced, the current draw, or demand, of the load 22 will be satisfied by an increase in the current output of the cooler power module(s) 18. Thus, a substantially constant current output of the power generating system 10 to the load 22 is maintained.

In various embodiments, the TCCSS 14 constantly adjusts, e.g., reduces, the voltage output of the hotter power module(s) 18, via the voltage regulation circuit(s) 26, until the operational temperature of the hot spots of all the power modules 18 are substantially in equilibrium, i.e., at substantially the same temperature, thereby substantially achieving a thermal equilibrium among all the power modules 18.

For example, if the voltage regulation circuits 26 of a first and a second power module 18 are causing the two power modules 18 to output approximately equal voltage, but the environmental conditions are such that the operational temperature of the second power module 18 increases to a temperature that is higher than that of the first power module, the TCCSS 14 will begin to reduce the voltage output by the voltage regulation circuit 26 of a second power module 18. This will result in a reduction of current output by the second power module 18 that in turn will result in a lowering of the operational temperature of the second power module 18. Substantially simultaneously, the current output by the first power module 18 will increase to satisfy the current demand of the load 22. This will result in an increase in operational temperature of the first power module 18. The TCCSS 14 will continue to adjust the voltage output of the first voltage regulation circuit 26 until the first and second power modules 18 effectively reach a thermal equilibrium. Thus, the current output to the load 22 by the power generating system 10 will not be shared in terms of equal current from each power module 18, but rather in terms of thermal characteristics of each respective power module 18.

Figure 2:
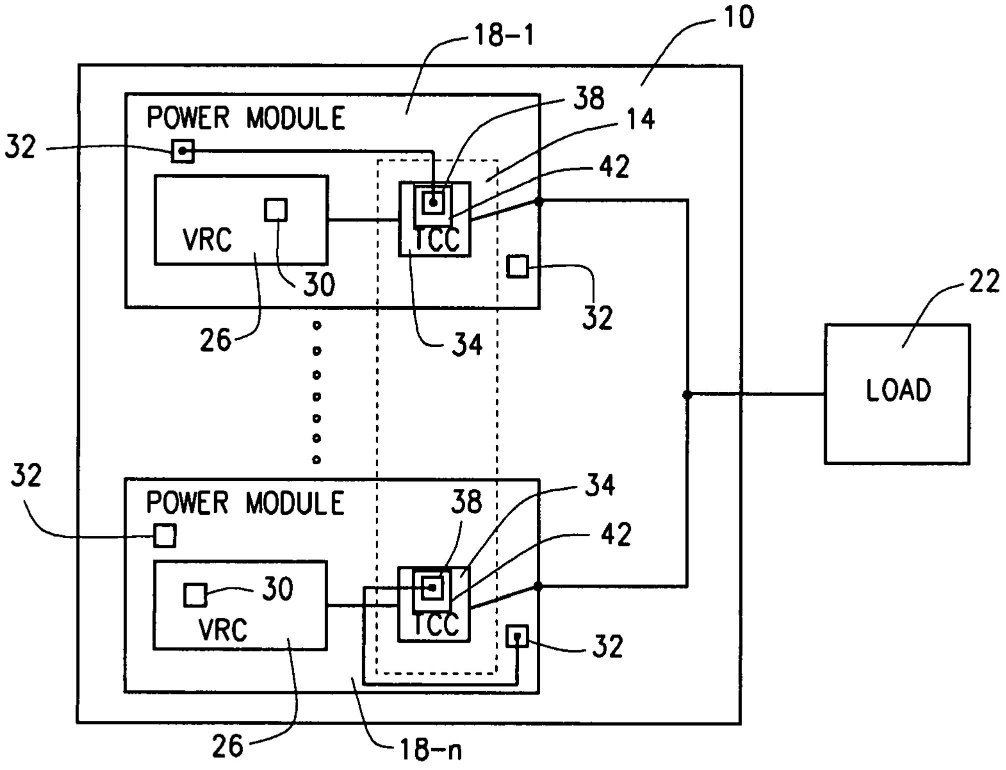
FIG. 2 is a block diagram illustrating the power generating system shown in FIG. 1 including a plurality of temperature based control circuits, in accordance with various implementations.

Referring now to FIG. 2, in various embodiments the TCCSS 14 may include a plurality of thermal control circuits 34 such that each power module 18 includes a respective thermal control circuit 34. Each thermal control circuit 34 includes a thermal sensor 38 that is thermally tied to the target location, i.e., hot spot, of the respective power module 18. In addition to the thermal sensor 38, each thermal control circuit 34 includes circuitry 42 for controlling the voltage output by the respective voltage regulation circuit 26 based on the hot spot temperature sensed by the respective thermal sensor 38. More particularly, each thermal control circuit 34 is structured and operable to monitor the respective hot spot temperature by placement of the thermal sensor 38 on the hot spot and control the voltage output by the respective voltage regulation circuit 26 such that a thermal equilibrium is substantially obtained among all the power modules 18, as described above.

Each thermal control circuit 34 can comprise any thermal sensor 38 and other circuitry 42 suitable to monitor the respective hot spot temperature and control the voltage output by the respective voltage regulation circuit 26 based on the sensed temperature. For example, in various embodiments, each thermal control circuit 34 may comprise a voltage divider including a thermistor, thermally tied to the respective hot spot, and one or more resistors. Accordingly, as the temperature of the hot spot increases, the resistance of the thermistor increases causing the voltage divider to reduce the voltage output by the respective voltage regulation circuit 26, thereby reducing the current output by the respective power module 18. Similarly, as the temperature of the hot spot decreases, the resistance of the thermistor decreases such that the voltage divider allows the voltage output by the respective voltage regulation circuit 26 to increase, thereby allowing the current output by the respective power module 18 to increase as necessary to satisfy the current draw of the load 22. Accordingly, the thermal control circuits 34 control the current outputs of the respective power modules 18 to substantially maintain a thermal equilibrium among all the power modules 18.

As described above, since the power modules 18 are operable in a current sharing configuration, the cumulative current output of the power modules 18, i.e., the current output of the power generating system 10, is self-leveling. That is, as the current output by the hotter power module(s) 18 is reduced, the current draw, or demand, of the load 22 will be satisfied by an increase in the current output of the cooler power module(s) 18. Thus, a substantially constant current output of the power generating system 10 to the load 22 is maintained.

In various other embodiments, each thermal control circuit 34 may include an analogue to digital converter system electrically tied to each respective thermal sensor 38. Accordingly, each thermal control circuit 34 may adjust the voltage output by the respective voltage regulation circuit 26 by digitally stepping the voltage output up or down in accordance with the hot spot temperature as sensed by the respective thermal sensor 38 to substantially maintain a thermal equilibrium among all the power modules 18.

Figure 3:
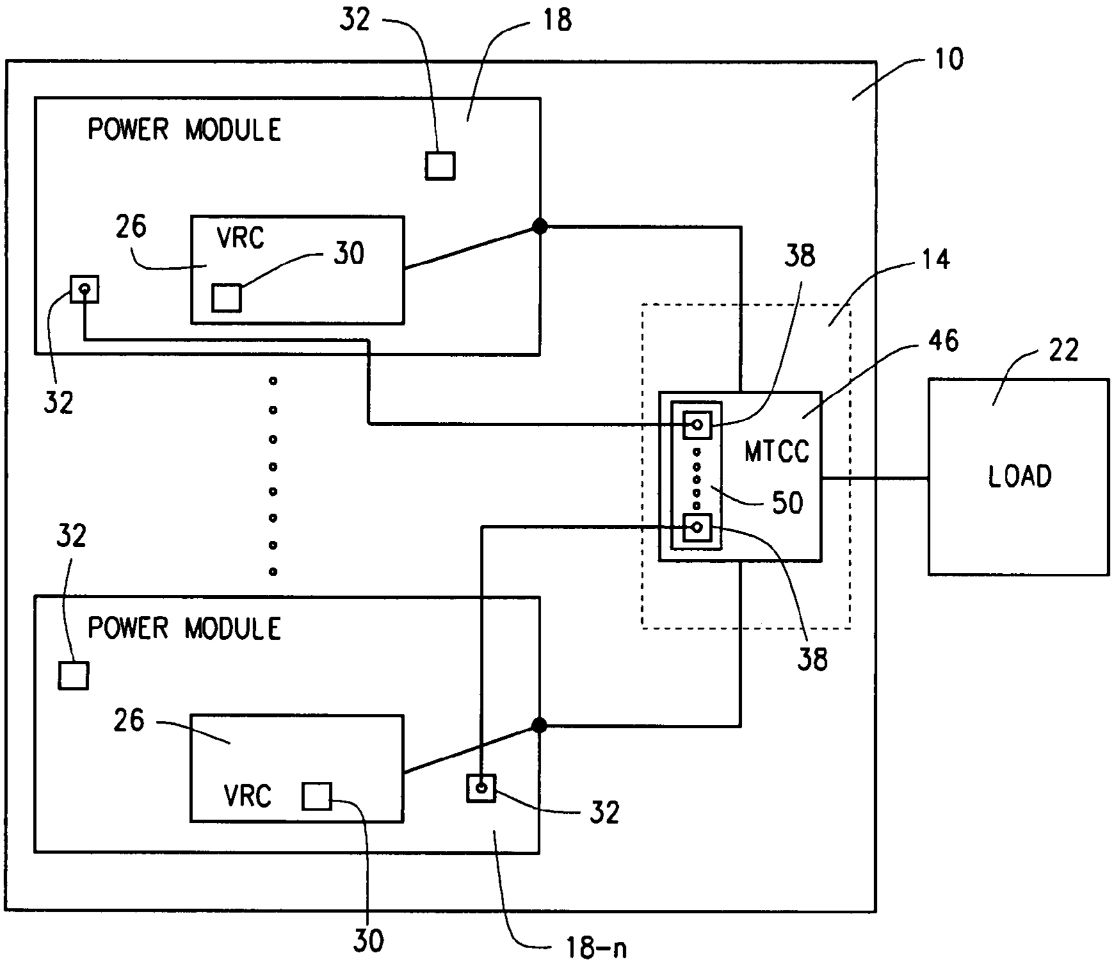
FIG. 3 is a block diagram illustrating the power generating system shown in FIG. 1 including a master temperature based control circuit, in accordance with various other implementations.

Referring now to FIG. 3, in various embodiments the TCCSS 14 may include a single master thermal control circuit 46 that includes a plurality of thermal sensors 38. In such embodiments, each thermal sensor 38 is thermally tied to the target location, i.e., hot spot, of a corresponding one of the power module voltage regulation circuits 26. In addition to the plurality of thermal sensors 38, the master thermal control circuit 46 includes circuitry 50 for controlling the voltage output by each of voltage regulation circuits 26 based on the hot spot temperature sensed by the respective thermal sensors 38. More particularly, the master thermal control circuit 46 is structured and operable to monitor the hot spot temperatures of each power module 18 and control the voltage output by the respective voltage regulation circuits 26 such that a thermal equilibrium is substantially obtained among all the power modules 18, as described above.

The master thermal control circuit 46 can comprise any thermal sensors 38 and other circuitry 50 suitable to monitor the hot spot temperatures of each of the power modules 18 and control the voltage output by the respective voltage regulation circuits 26 based on the sensed temperatures. For example, in various embodiments, the master thermal control circuit 46 may comprise a plurality of voltage divider circuits that each includes a thermistor, e.g., a positive temperature coefficient thermistor, thermally tied to a respective hot spot, and one or more resistors. Accordingly, as the temperature of any hot spot increases, the resistance of the respective thermistor increases causing the respective voltage divider to reduce the voltage output by the respective voltage regulation circuit 26, thereby reducing the current output by the respective power module 18. Similarly, as the temperature of any hot spot decreases, the resistance of the respective thermistor decreases such that the respective voltage divider allows the voltage output by the respective voltage regulation circuit 26 to increase, thereby allowing the current output by the respective power module 18 to increase as necessary to satisfy the current draw of the load 22. Accordingly, the master thermal control circuit 46 controls the current output of all the power modules 18 to substantially maintain a thermal equilibrium among all the power modules 18.

In various other embodiments, the master thermal control circuit 46 may include a plurality of analogue to digital (A/D) converters circuits, whereby each A/D converter circuit is electrically tied to a corresponding one of the thermal sensors 38. Accordingly, the master thermal control circuit 46 may adjust the voltage output by each of the voltage regulation circuits 26 by digitally stepping the voltage outputs up or down in accordance with the hot spot temperatures as sensed by the respective thermal sensors 38 to substantially maintain a thermal equilibrium among all the power modules 18.

Therefore, the systems and methods described above control the voltage output, and thus the current output, of the power modules based upon the thermal characteristics in order to establish approximate thermal equilibrium among the power modules and thereby maximize system reliability. That is, implementation of the systems and methods described above control output current not in terms of equal current sharing, but rather in terms of shared thermal characteristics of the power modules.

The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. A method for sharing current among a plurality of power modules utilized to power an electronic system, each of the plurality of power modules including a plurality of heat generating subcomponents, said method comprising:

reducing an amount of current output from a first of the plurality of power modules if a first temperature sensed at a first heat generating subcomponent of the first power module is greater than a second temperature sensed at a second heat generating subcomponent of a second of the plurality of power modules.

2. The method of claim 1, wherein the first temperature and the second temperature are sensed by monitoring the temperature at or near a ‘hot spot’ of each power module via a corresponding one of a plurality of thermal sensors.

3. The method of claim 2, wherein the reducing the amount of current further comprises:

controlling an output voltage of the first power module based on the ‘hot spot’ temperature of the first power module such that the output current is reduced based on the ‘hot spot’ temperature of the first power module.

4. The method of claim 1, wherein the reducing of the amount of current output from the first power module establishes an approximate thermal equilibrium between the plurality of power modules based on the thermal characteristics of the plurality of heat generating subcomponents.

5. The method of claim 4, wherein the reducing the amount of current output from the first power module further comprises controlling the voltage output of each of the plurality of power modules to establish an approximate thermal equilibrium between power modules by approximately equalizing 'hot spot' temperatures among the power modules, each power module having a 'hot spot'.

6. The method of claim 5, wherein the reducing the amount of current output from the first power module further comprises reducing the output voltage of the first power module as the temperature of the 'hot spot' increases to equalize 'hot spot' temperatures among the plurality of power modules.

7. The method of claim 1, wherein reducing the amount of current output from the first power module comprises:

monitoring the temperature at or near a 'hot spot' of each of the plurality of power modules during operation of the plurality of power modules; and reducing the output current of the first power module based on the 'hot spot' temperature of the first power module to establish an approximate thermal equilibrium among the plurality of power modules.

8. The method of claim 7, wherein the reducing the amount of current further comprises:

controlling an output voltage of the first power module based on the 'hot spot' temperature of the first power module such that the output current is reduced based on the 'hot spot' temperature of the first power module.

9. The method of claim 8, wherein the reducing the amount of current output from the first power module comprises reducing the output voltage of the first power module as the temperature of the 'hot spot' of the first power module increases to equalize 'hot spot' temperatures among the plurality of power modules.

10. A power generating system, said system comprising:

a plurality of power modules outputting current to a common load, each of the plurality of power modules including a plurality of heat generating subcomponents; and a thermally controlled current sharing subsystem operable to control the current output by each of the power modules to establish an approximate thermal equilibrium among the power modules; wherein the thermally controlled current sharing subsystem reduces current output from a first of the plurality of power modules if a first temperature sensed at a first heat generating subcomponent of the first power module is greater than a second temperature sensed at a second heat generating subcomponent of a second of the plurality of power modules.

11. The system of claim 10, wherein the thermally controlled current sharing subsystem comprises a plurality of thermal control circuits, each thermal control circuit included in one of the plurality of power modules for controlling the current output by the power module based on the thermal characteristics of the plurality of heat generating subcomponents.

12. The system of claim 11, wherein each power module comprises a voltage regulation circuit and each thermal control circuit comprises voltage control circuit for controlling the voltage output by the voltage regulation circuit.

13. The system of claim 12, wherein each thermal control circuit further comprises a thermal sensor associated with a 'hot spot' of the power module to monitor the temperature of the hot spot such that the voltage control circuit controls the voltage output by the voltage regulation circuit to control the current output by the power module based on the 'hot spot' temperature.

14. The system of claim 13, wherein the thermal sensors comprise thermistors and the voltage control circuits comprise a voltage divider circuits.

15. The system of claim 10, wherein the thermally controlled current sharing subsystem comprises a master thermal control circuit for controlling the current output by each of the plurality of power modules based on thermal characteristics of the plurality of heat generating subcomponents.

16. The system of claim 15, wherein each power module comprises a voltage regulation circuit and the master thermal control circuit comprises a voltage control circuit for controlling the voltage output by each of the voltage regulation circuits.

17. The system of claim 16, wherein the master thermal control circuit further comprises a plurality of thermal sensors, each thermal sensor associated with a 'hot spot' of a one of the plurality of power modules to monitor the temperature of the 'hot spot' such that voltage control circuitry controls the voltage output by each of the voltage regulation circuits to control the current output by the power module based on the 'hot spot' temperature.

18. The system of claim 17, wherein each thermal sensor comprises a positive temperature coefficient thermistor.

19. A power generating system, said system comprising:

a plurality of power modules outputting current to a common load, each of the plurality of power modules including a plurality of heat generating subcomponents; and a thermally controlled current sharing subsystem operable to control the current output by each of the power modules to establish an approximate thermal equilibrium among the power modules; wherein the thermally controlled current sharing subsystem redistributes contributions of the plurality of power modules to the current output to the common load if a first temperature sensed at a first heat generating subcomponent of a first power module is greater than a second temperature sensed at a second heat generating subcomponent of a second of the plurality of power modules.

20. The system of claim 19, wherein the first temperature and the second temperature are sensed by monitoring the temperature at or near a 'hot spot' of each power module via a corresponding one of a plurality of thermal sensors.

* * * * *